(12) United States Patent
Chernykh et al.

(10) Patent No.: US 9,758,636 B2
(45) Date of Patent: Sep. 12, 2017

(54) HIGH-TRANSPARENT, THERMOPLASTICALLY PROCESSIBLE POLYMER COMPOSITIONS

(71) Applicant: Macromolecular, Inc., Mountain View, CA (US)

(72) Inventors: Sergey Chernykh, Aleksandrovka (RU); Ilya Likhtenfeld, Moscow (RU); Alexander Volkov, Moscow (RU)

(73) Assignee: Rebel, Inc., Mountain View, CA (US)

( * ) Notice: Subject to any disclaimer, the term of this patent is extended or adjusted under 35 U.S.C. 154(b) by 0 days.

(21) Appl. No.: 14/572,708

(22) Filed: Dec. 16, 2014

(65) Prior Publication Data

US 2016/0168293 A1   Jun. 16, 2016

(51) Int. Cl.
*C08F 220/18*      (2006.01)
*C08K 5/11*        (2006.01)
*C08L 33/10*       (2006.01)
*C08F 120/44*      (2006.01)

(52) U.S. Cl.
CPC ............ *C08K 5/11* (2013.01); *C08L 33/10* (2013.01); *C08F 120/44* (2013.01); *C08F 2220/1808* (2013.01)

(58) Field of Classification Search
CPC .. C08K 5/11; C08F 120/44; C08F 2220/1808; C08F 220/18; C08F 220/14; C08F 220/20; C08L 33/10; C08L 2205/02; C08L 2201/10
USPC .................. 524/314; 525/102, 223
See application file for complete search history.

(56) References Cited

U.S. PATENT DOCUMENTS

| | | |
|---|---|---|
| 3,676,404 A | 7/1972 | Nield |
| 3,943,190 A | 3/1976 | Abe et al. |
| 3,957,921 A | 5/1976 | Iwahashi et al. |
| 4,098,988 A | 7/1978 | Gisser et al. |
| 4,115,615 A | 9/1978 | de Buck van Overstraeten |
| 4,546,493 A | 10/1985 | Bortnick |
| 4,749,749 A | 6/1988 | Munzer et al. |
| 4,892,909 A | 1/1990 | Siol et al. |
| 4,959,408 A | 9/1990 | Grant |
| 5,248,732 A | 9/1993 | Drzewinski |
| 5,280,070 A | 1/1994 | Drzewinski |
| 5,446,096 A | 8/1995 | Drzewinski |
| 5,518,798 A | 5/1996 | Riedel |
| 5,726,268 A | 3/1998 | Sakamoto |
| 2008/0139836 A1 | 6/2008 | Le et al. |
| 2009/0208739 A1 | 8/2009 | Husemann et al. |

FOREIGN PATENT DOCUMENTS

JP         06199908 A  *  7/1994

OTHER PUBLICATIONS

JP 06-199908 A (1994), machine translation, JPO Japan Platform for Patent Information (J-PlatPat).*
Bhola R, Bhola SM, Liang H, Mishra B, "Biocompatible Denture Polymers—A Review", Trends Biomater Artif Organs. 2010; 23(3):129-136.
Vieweg and Esser, "Kunststoff-Handbuch", Issue IX, "Polymethacrylates", p. 112-117 ets. 009843.
Paul Ursell et al., "Anterior Capsule Stability in Eyes With Intraocular Lenses Made of Poly(Methyl methacrylate), Silicone, and AcrySof", J. Cataract Refractive Surg., vol. 23, pp. 1532-1538, 1997.
G. Moad, D.H. Solomon, "The Chemistry of Radical Polymerization", 2006, pp. 181-246, Elsevier ltd.

* cited by examiner

*Primary Examiner* — Josephine Chang
(74) *Attorney, Agent, or Firm* — David H. Jaffer; Pillsbury Winthrop Shaw Pittman LLP

(57) ABSTRACT

A high-transparent, thermoplastically processable polymer composition is described. In an exemplary embodiment, the polymer composition includes an acrylate organic polymer. The acrylate organic polymer is a copolymer that can include functional groups of hydrocarbon group up to nine carbon atoms, hydroalkyl group, halogenated hydrocarbon groups, aminoalkyl group, aryl group, cycloalkyl group, and/or a combination thereof. The polymer composition may further include a polysilicon compound, polycarbonate polymer, a polyvinyl polymer, a plasticizer, and/or a combination thereof.

5 Claims, 2 Drawing Sheets

HIGH-TRANSPARENT, THERMOPLASTICALLY PROCESSIBLE POLYMER COMPOSITIONS

FIELD OF INVENTION

This invention relates generally to a polymer mixtures and more particularly to polymer mixtures including polymers and/or copolymers of acrylates, polycarbonates, polysiloxanes, and different polyvinyl polymers that are highly transparent and thermoplastically processible.

BACKGROUND OF THE INVENTION

Polyacrylate polymers are widely known and used for producing various different structural materials and composites. A common acrylic polymer today is poly (methyl methacrylate) (PMMA), which has excellent optical properties. PMMA is used in the manufacture of organic glasses, bulletproof security barriers, LCD screens, furniture and many other applications. Methacrylate polymers are used extensively in medical and dental applications where purity and stability are critical to performance, for example for fabrication of intraocular lens (Ursell et al., *Anterior Capsule Stability in Eyes With Intraocular Lenses Made of Poly(methyl methacrylate), Silicone, and AcrySof*, J. Cataract Refractive Surg., vol. 23, pp. 1532-1538, 1997) and in denture industry (Rahul Bhola at al., Trends Biomater. Artif. Organs, Vol 23(3), pp 129-136, 2010).

PMMA can further be modified to give different properties of the material without severely compromising the optical properties of polyacrylates, such as in Jap. Patent No. 06287398 or U.S. Pat. No. 4,749,749. However, in practice, the properties of methacrylate-based polymer blends by making modification to the methacrylate-based polymer blends are based on PMMA (See, e.g., U.S. Pat. No. 4,959,408). In addition, there are known problems associated with a deficiency of the mechanical properties of acrylates with molecular weights below 100,000, especially 50,000 (see Vieweg and Esser, "Kunststoff-Handbuch", Issue IX, "Polymethacrylates", page 112 ets.)

SUMMARY OF THE DESCRIPTION

A high-transparent, thermoplastically processable polymer composition is described. In an exemplary embodiment, the polymer composition includes an acrylate organic polymer. The acrylate organic polymer is a copolymer that can include functional groups of hydrocarbon group up to nine carbon atoms, hydroalkyl group, halogenated hydrocarbon groups, aminoalkyl group, aryl group, cycloalkyl group, and/or a combination thereof. In addition, the polymer composition includes a $C_1$-$C_{20}$ alkyl methacrylate polymer, 95-5% by weight with the acrylate organic polymer is 5-95% by weight. The polymer composition may further include a polysilicon polymer, a polycarbonate polymer, a polyvinyl polymer, a plasticizer, and/or a combination thereof.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
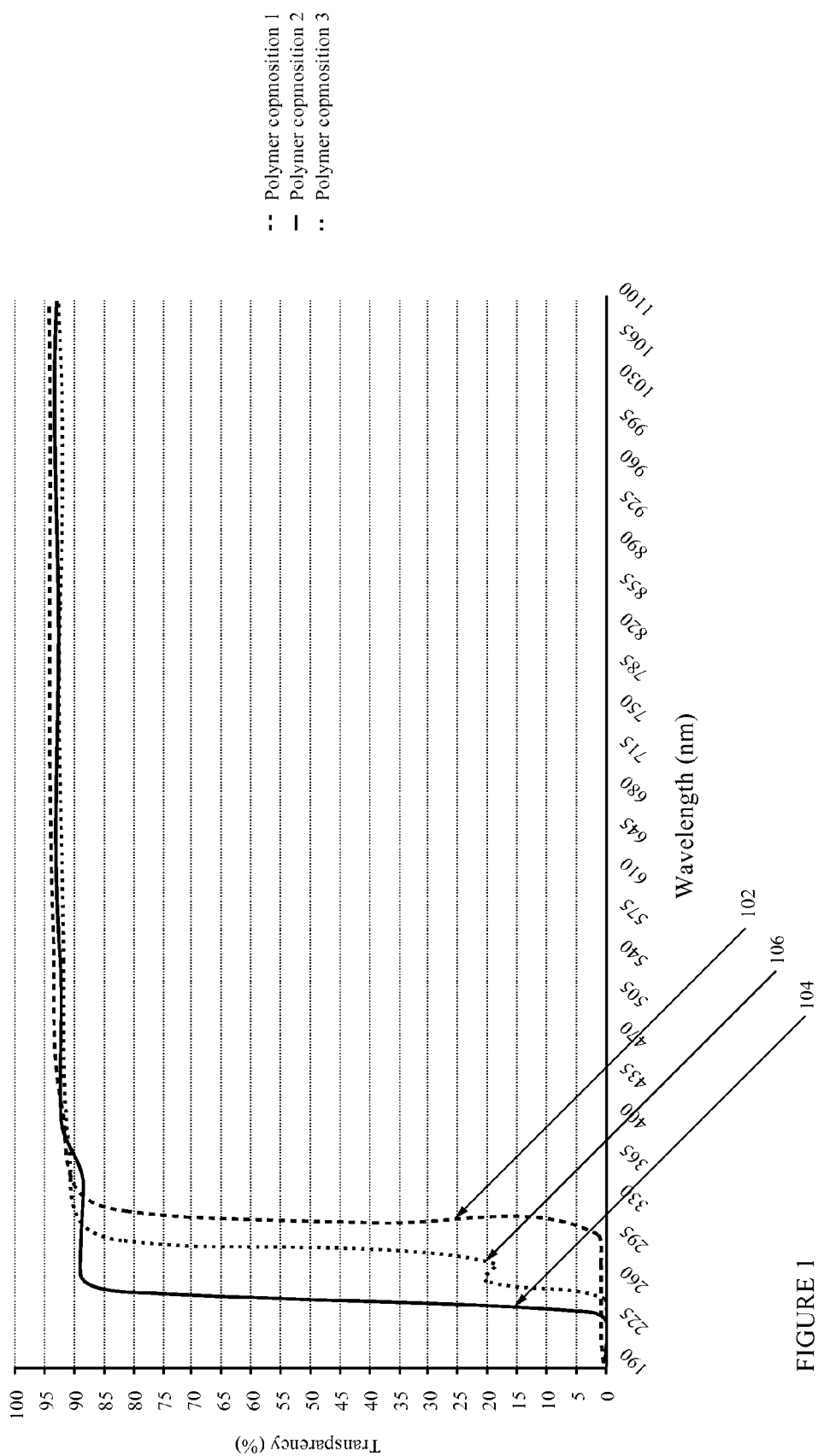
FIG. 1 is an illustration of one embodiment of an optical transparency plot of different polymer compositions over a spectrum of wavelengths.

A polymer mixture comprised of polymers and/or copolymers of acrylates, polycarbonates, polysiloxanes, and different polyvinyl polymers that are highly transparent and thermoplastically processible is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

A polymer composition is a polymer blend of polymer and/or copolymers of acrylates, polycarbonates, polysiloxanes, and/or different polyvinyl polymers that are highly transparent and thermoplastically processible is described. In one embodiment, the polymer composition includes a composition of a base polymer, which is a copolymer of acrylates series/methacrylate with different possible monomers. As will be described below, using different type and amounts of acrylate monomers can vary the properties of the base polymer.

Blending the base polymer with one or more different polymers can further modify the properties of the polymer composition. In a further embodiment, the polymer composition includes the base polymer and a $C_1$-$C_{20}$ alkyl methacrylate. In another embodiment, the polymer composition includes a polysilicon compound that is added to the base polymer and a $C_1$-$C_{20}$ alkyl methacrylate. In a further embodiment, a polycarbonate is added to the base polymer and $C_1$-$C_{20}$ alkyl methacrylate. In a still further embodiment, a polyvinyl polymer is added to the base polymer and $C_1$-$C_{20}$ alkyl methacrylate. In another embodiment, the polymer composition includes the base polymer, $C_1$-$C_{20}$ alkyl methacrylate, and one or more of the polysilicon compound, polycarbonate, polyvinyl polymer, an alkyl ester of acrylic acid, a solvent, an alcohol and its ester, and/or a combination thereof. In one embodiment, thermoplastically means that the polymer can be processed into final products by transferring it into the thermoplastic state by heating or mechanical action. Polymer melts become flowable and can be molded in final products of any required shape and size.

Through a combination of properties and ease of processing of polymeric materials based on polyacrylates, the polymer composition can be used in a wide number of solutions for a large number of practical problems. In this embodiment, the polymer composition can be used to expand the range of applications available to be performed by the above materials by varying the structure at the stage of the polymer composition design, the use of functional replacement and methods of producing copolymer considering features of quantitative and qualitative balance of system components, as well as the conditions of the polymerization process.

In another embodiment, the polymer composition expands the range of tasks available for these compositions by varying the structure of the base polymer and/or the polymer blends without degradation of their optical and physico-chemical properties. For example, the polymer composition properties can be achieved by functional replacement and variation of preparation methods of copolymer, quantitative and qualitative proportions of components, as well as the conditions of the polymerization process.

In one embodiment, the polymer compositions described herein relate to modified acrylic copolymers that are used to prepare polymer compositions with a given range of properties. The properties can be optical properties, mechanical properties, thermal properties, barrier properties, and/or other properties. As will be described below, the monomers for the base polymer can be acrylates that include H, alkyl groups, hydroxyalkyl groups, halogenated alkyl groups, aryl, and/or cycloalkyl groups. These properties define the structural modifications of the monomers participating in the polymerization process. Furthermore, the invention relates to a process for preparing said modified acrylic copolymers, as through the polymerization process conditions can influence the future properties of the resulting polymeric material.

In one embodiment, a base polymer is used as a base of the polymer composition to give the desired optical properties. In addition, the base polymer may be blended with other polymer(s) to improve the thermal or mechanical properties of the polymer composition. In one embodiment, these distinctive properties are sets of optical and/or mechanical properties. In addition, these properties can be influenced not only by a combination of the monomers involved in the polymerization process, and by the ratio of the reactive monomers, as well as the conditions of the polymerization process.

Furthermore, the properties of a polymer composition can be influenced by the change of the spatial structure of the reactants in the polymerization. For example and in one embodiment, varying the chain length of the radical monomer residues in the structure can affect the elasticity of the resulting polymer composition. Moreover, the polymer properties can be modified by substitution of the functional monomer in the structure, before the start of the polymerization process.

In one embodiment, the base polymer can be improved by blending the base polymer with other polymers so the resulting polymer composition can be used for different applications (e.g., flexible fibers and films, yarns, coverings, coatings, separate elements of final products).

By taking a random polymer and trying to modify this polymer with other additive polymers (e.g., with a goal to provide the resulting polymer mixture with new properties), a chemist will face the following problems: limited compatibility of components, unpredictable result and quality, or other types of polymer problems. This is because the interactions between the random polymer and additive polymers have a physical sense (not chemical). In one embodiment, by taking the base polymer and trying to modify it (with a goal to provide the resulting polymer mixture with new properties), a chemist does not initially need to put additive polymers in this composition. This is because modification of the base polymer occurs as result of the copolymerization process. In this embodiment, modification of the base monomers with additive monomers is a chemical modification, not a physical mixing of two polymers. The connections between the base component and modifying components are a chemical connection and are stronger, so there is not a difficulty with compatibility and distribution. In this embodiment, a chemist can predict the result and quality of possible compositions.

The polymer composition embodiments described above modify the properties of copolymers that allow wide application of the polymer composition. In one embodiment, the final polymer result (or polymer composition) is influenced by the quality of the initial chemical reagents (e.g., the quality of monomers and a type of the applied initiator), and the conditions of conduction of the copolymerization process (e.g., temperature, pressure, intermixing rate, the sequence of the component insertion, time).

In one embodiment, the polymer composition has improved optical properties over previously known optical properties of polymethylmethacrylate (PMMA). In addition, the polymer composition improves upon certain deficiencies with basic polymethacrylates properties, for example, elasticity, lack of brittle fracture, and others types of properties. The polymer composition extends the scope of applications for the polymer composition over applications that are suitable for PMMA. In addition, the polymer composition has the improved properties when compared to known polymers of acrylates, polycarbonates, polysiloxanes, polyvinylchloride, polystyrene, or other types of polymers. For example and in one embodiment, the polymer composition has a combination of the optical and physico-mechanical properties that show high transparency in the ultra violet (UV), visible light, and near infrared (IR) light (See, e.g., Table III below). In addition, the polymer composition exhibits good tensile strength, percentage of elongation, and flexural strength (See, e.g., Table II below).

In one embodiment, the mentioned polymer composition has the properties sufficient to transform it thermomechanically, in particular through extrusion, injection molding, thermoforming techniques, and/or vacuum injection molding.

In one embodiment, the polymer composition includes a base polymer and a number of additional polymers and/or other components. The base polymer is selected from the series of polyacrylates/polymethacrylates distinctive due to their optical properties. For example and in one embodiment, the base polymer is a methacrylate copolymer of Formula (I), described below. In this embodiment, the base polymer exhibits superb optical properties. For example and in one embodiment, the base polymer exhibits an optical transparency greater than 90% over a wide range of wavelengths of light. FIG. 1 is an illustration of one embodiment of an optical transparency plot of different polymer compositions over a spectrum of wavelengths. In FIG. 1, the three different polymer compositions are plotted for optical transparency over a spectrum of wavelengths (190-1100 nm). The three different polymer compositions are the base polymer of Example I, the base polymer with a polycarbonate of Example II, the base polymer and hydrosiloxane of Example III, described below. As illustrated in FIG. 1, each of the polymer compositions has greater than 90% transparency over wavelengths 350-1100 nm. This is a greater transparency than quartz, which has an optical transparency of mid-high 80% over the same wavelength range. Polymer composition 1 (102) has greater than 90% transparency over wavelengths 350-1100 nm. The other two polymer compositions exhibit greater range of good optical transparency, for example, polymer composition 2 (104) has greater than 90% transparency over wavelengths 300-1100 nm. Polymer composition 3 (106) has near 90% transparency over wavelengths 260-380 nm and greater than 90% transparency over wavelengths 380-1100 nm.

In one embodiment, to improve the physical and mechanical characteristics of the polymer composition, additional polymers can be blended to the base polymer composition, such as polycarbonates, polysiloxanes, polyvinyl acetates, acrylonitrile, etc. In addition, the component ratio of additional polymers may be different and vary within certain limits. The components of the polymer composition, within the specified ratios, can be characterized by the compatibility between them. The polymer composition may further include additional additives, such as plasticizing additives, stabilizing additives, process and functional additives.

Furthermore, the polymeric composition may be a basis for the preparation of emulsion and dispersion varnishes prepared by appropriate solvents. The suitable solvents are: acetic acid (ethyl acetate, butyl acetate etc.), ketenes (acetone, methyl ethyl ketene), tetrahydrofuran, acetone, alcohol, halocarbon etc.

Base Polymer

In one embodiment, the base polymer is a polymer or copolymer of acrylate series/methacrylate having Formula (I):

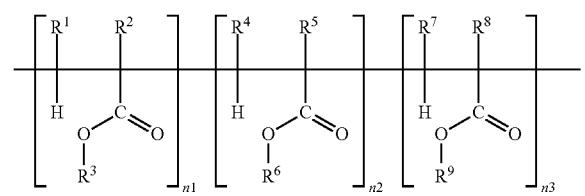

Formula (I)

where $R^1$, $R^4$, $R^7$ can each be a hydrogen, or hydrocarbon group having 1-3 carbon atoms (e.g., $CH_3$, $C_2H_5$, $C_3H_7$, $C_2H_3$, $C_3H_5$); $R^2$, $R^5$, $R^8$ can each be a hydrogen or hydrocarbon group having 1-9 carbon atoms (e.g., $CH_3$, $C_2H_5$, $C_3H_7$, $C_4H_9$, $C_5H_{11}$, $C_6H_{13}$, $C_7H_{15}$, $C_8H_{17}$, $C_9H_{19}$); $R^3$, $R^6$, $R^9$ can each be a hydrocarbon group having 1-9 carbon atoms (for example $CH_3$, $C_2H_5$, $C_3H_7$, $C_4H_9$, $C_5H_{11}$, $C_6H_{13}$, $C_7H_{15}$, $C_8H_{17}$, $C_9H_{19}$), a hydroxyalkyl group each having 1-9 carbon atoms (e.g., $CH_3O$, $C_2H_5O$, $C_3H_{70}$, $C_4H_9O$, $C_5H_{11}O$, $C_6H_{13}O$); an aminoalkyl group having 1-6 carbon atoms (for example $CH_4N$, $C_2H_6N$, $C_3H_8N$, $C_4H_{10}N$, $C_5H_{12}N$, $C_6H_{14}N$), a halocarbon group having 1-6 carbon atoms and one or more halogens (e.g., $CH_2X$, $CHX_2$, $CX_3$, $C_2H_5X$, $C_2H_4X_2$, $C_2H_3X_3$, $C_2H_2X_4$, $C_2HX_5$, $C_2X_6$, $C_3H_6X$, $C_3H_5X_2$, $C_4H_8X$, $C_4H_7X_2$; where X may be F or Cl or a combination of F or Cl), an aryl group, or a cycloalkyl group having 4-8 carbon atoms.

The groups $R^3$, $R^6$, $R^9$ may be equal or different or be a combination of any of the above. In addition, n1, n2, n3 are each an integer from 5 to 30,000. In one embodiment, n1, n2, n3 are each an integer between 100 and 10,000. In one embodiment, the groups $R^1$, $R^4$, $R^7$ can be the same or different, the groups $R^2$, $R^5$, $R^8$ can be the same or different, and/or the groups $R^3$, $R^6$, $R^9$ can be the same or different. In one embodiment, n3 may be zero, where the base polymer includes two monomers instead of three. In this embodiment, the base polymer includes side chains $R^1$, $R^2$, $R^3$, $R^4$, $R^5$, and $R^6$ as described above.

Polymer Blend Additives

In one embodiment, a $C_1$-$C_{20}$-alkyl methacrylate polymer can be added to the polymer composition. In this embodiment, the base polymer is 5-95% by weight and the $C_1$-$C_{20}$-alkyl methacrylate polymer is added 95-5% by weight. In this embodiment, a $C_1$-$C_9$-alkyl methacrylate is added to the base polymer in a 5-95% base polymer: 95-5% $C_1$-$C_{20}$-alcyl methacrylate polymer by weight composition. While in one embodiment, the base polymer is a polymer of Formula (I), in alternate embodiments the base polymer is a polymer blend of the polymer of Formula (I) and the $C_1$-$C_{20}$-alcyl methacrylate polymer. In one embodiment, adding more of the $C_1$-$C_{20}$-alkyl methacrylate polymer can increase the strength of the resulting polymer composition depending on the molecular mass of the $C_1$-$C_{20}$-alkyl methacrylate. A higher mass $C_1$-$C_{20}$-alkyl methacrylate can increase the strength of the resulting polymer composition. Too much $C_1$-$C_{20}$-alkyl methacrylate can, in some embodiments, decrease the optical properties (e.g., turbidity can be observed).

In one embodiment, adding a polysilicon polymer can modify the polymer composition. In this embodiment, the polysilicon polymer can be a polysilane or a polysilazane. This not only results in a physical modification, but also structural substitution that can lead to a resulting polymer composition with a unique set of composition properties. For example and in one embodiment, in addition to good optical properties and good mechanical properties, this polymer composition will have a high resistance to various chemical agents (acids, alkalis, organic solvents) and high antifriction properties (low coefficient of friction). For example and in one embodiment, the polymer composition in a polysilicon polymer having Formula (II):

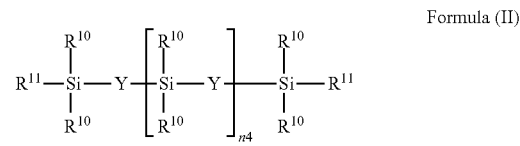

Formula (II)

where Y is an O or NH; $R^{10}$ is a hydrocarbon group having 1-9 carbon atoms (e.g., $CH_3$, $C_2H_5$, $C_3H_7$, $C_4H_9$, $C_5H_{11}$, $C_6H_{13}$, $C_7H_{15}$, $C_8H_{17}$, $C_9H_{19}$); $R^{11}$ can be a hydrogen, a hydrocarbon group having 1-3 carbon atoms (e.g., $CH_3$, $C_2H_5$, $C_3H_7$, $C_2H_3$, $C_3H_5$), an aminoalkyl or hydroxyalkyl group having 1-6 carbon atoms (e.g., $CH_4N$, $C_2H_6N$, $C_3H_8N$, $C_4H_{10}N$, $C_5H_{12}N$, $C_6H_{14}N$, $CH_3O$, $C_2H_5O$, $C_3H_{70}$, $C_4H_9O$, $C_5H_{11}O$, $C_6H_{13}O$); and n4 is an integer from 1,000 to 20,000. In one embodiment, n4 is an integer between 1,000 and 10,000.

In a further embodiment, a polycarbonate can be added to the polymer composition. In this embodiment, adding the polycarbonate increases the impact strength and mechanical durability of the resulting polymer composition. In one embodiment, the polycarbonate is one having a structure of Formula (III):

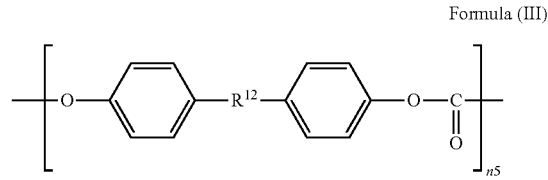

Formula (III)

where, $R^{12}$ is straight or branched hydrocarbon group having 1-9 carbon atoms, a nitrogen, an oxygen, a sulfur, a single bond, a carbonyl group, or a sulfonyl group, and n5 is an integer from 10 to 30,000. In another embodiment, n5 is an integer between 100 and 10,000. In one embodiment, the polycarbonate is added to the polymer composition up to 20% by weight.

In an additional embodiment, a polyvinyl polymer can be added to the polymer composition. In this embodiment, adding the polyvinyl polymer expands the applications of base polymer composition and facilitates certain operations like dyeing, etc. In one embodiment, the polyvinyl polymer is one having a structure of Formula (IV):

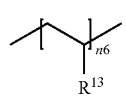

Formula (IV)

where, $R^{13}$ is a cyano group, an acetoxy group, a straight or branched hydrocarbon group having 1-9 carbon atoms, a hydroxy group, an alcohol fragment (e.g., hydroxymethyl, hydroxyethyl, hydroxylpropyl), and n6 is an integer from 10,000 to 300,000. In one embodiment, n6 is and between 15,000 and 250,000. For example and in one embodiment, the polyvinyl polymer can be a polyacrylonitrile, polyvinyl alcohol, polyvinyl acetate, polystyrene, polyvinyl chloride, or another type of polyvinyl polymer. In one embodiment, the polyvinyl polymer is added to the polymer composition up to 20% by weight.

In one embodiment, a plasticizer can be added to the polymer composition. In this embodiment, adding the plasticizer improves the ductility and elasticity, facilitates the molding process, reduces the brittleness temperature, and reduces the glass transition temperature of the resulting polymer composition. In one embodiment, the plasticizer is a $C_1$-$C_{20}$ alkyl ester of acrylic, a methacrylic acid, or a combination thereof. In one embodiment, the plasticizer is a phthalate (e.g. diethyl phthalate, dibutyl phthalate, and/or dioctyl phthalate) esters of sebacic acid, diphenic, naphthalic acids (e.g. dioctyl sebacate), alkyl ester of acrylic or methacrylic acid (e.g. methyl methacrylate, ethyl acrylate, and/or other methacrylic acids), benzyl alcohol, halogenated phosphoric acid esters (e.g. trichloroethyl phosphate, chloropropyl phosphate, and/or other halogenated phosphoric acid esters and/or a mixture of these components. In one embodiment, the plasticizer is added to the polymer composition up to 10% by weight.

In another embodiment, a stabilizing additive can be added to the polymer composition. In one embodiment, adding the stabilizer prevents the rapid aging of the material exposed to aggressive factors (ultra-violet light (UV), temperature, or other environmental factors). In one embodiment, the stabilizing additives can be: monoatomic and/or polyatomic alcohol, or their ester, such as isopropyl alcohol, amyl alcohol, isoamyl alcohol, hexyl alcohol, decyl alcohol, ethylene glycol, diethylene glycol, triethylene glycol, ethylene glycol monomethyl ester, ethylene glycol dimethyl ester, glycerol, glycerol monoacetate, glycerol triacetate. In one embodiment, the stabilizer is added to the polymer composition up to 5% by weight.

In a further embodiment, processing aids can be added to the polymer composition, such as calcium and magnesium stearate, dioctyl sebacate, glycerol ester, sorbitan ester, and/or an alkyl sulfonate. In another embodiment, functional additives can be added, such as fine powders of metals, fluorescent, and other soluble colorants. In this embodiment, the purpose of the introduction of these additives is to make the given set of properties of the polymer composition (e.g., fluorescence, color, magnetic properties, antibacterial, antistatic, and/or anti-adhesive properties).

In one embodiment, the proposed polymer composition may be used as a starting material for the manufacture of a wide variety of polymer products. The possibility of programming further properties of the polymer composition in a wide range is due to the possible modifications and variation of the structure of the polymer composition.

Specifics of a Configuration of the Functional Groups.

Regularities of the properties of future composition allowing for changes in the stages of receiving polymers and copolymers were found. Radical polymerization of selected monomers can give the desired properties of the base polymer. Wide range of variations of structures allows to program precisely properties of the future material.

Figure 2:
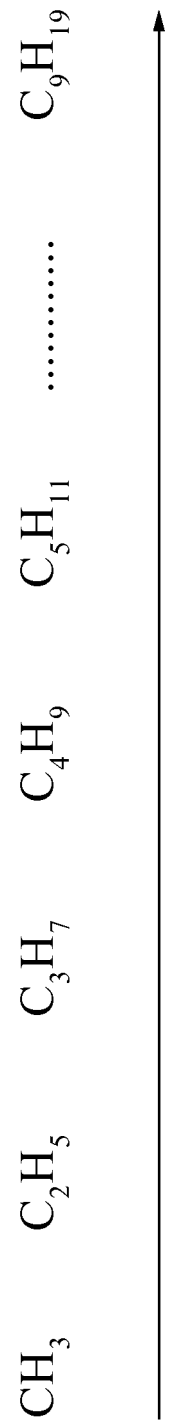
FIG. 2 is an illustration of one embodiment of aliphatic radical chain growth that increases elasticity of the polymer composition as the size of the aliphatic chain grows.

In one embodiment, increasing the number of carbon atoms in a hydrocarbon chain in either or both of the acrylic polymer and acrylic copolymer demonstrates an increase in elasticity of polymer composition with the optical properties of the polymer composition remaining high. For example and in one embodiment, as the hydrocarbon side chain length increases (e.g., by increasing the number of carbon atoms in the side chain), the elasticity of the polymer composition increases. In this example, increasing the side chain from a $CH_3$ to a $CH_2CH_3$, $CH_2CH_2CH_3$, etc. increases the elasticity of the polymer composition as illustrated in FIG. 2. In one embodiment, the polymer composition retains the optical properties even as the increase of elasticity occurs. Elasticity allows the polymer composition to return to its original shape after being deformed. For example and in one embodiment, a base polymer has the approximately the same elasticity with a smaller amount of a more elastic component (e.g., side chain $C_9H_{15}$) as with a higher amount of a less elastic component (e.g., side chain $C_3H_7$), everything else being equal. An example of the effect of monomer sides chain length on the elasticity of the polymer composition is illustrated in Table IV below.

In one embodiment, the increased elasticity occurs with unbranched hydrocarbon chain. In this embodiment, if the hydrocarbon side chain is branched out or closed in a cycle, the mobility of macromolecules is restricted and consequently the elasticity of the polymer composition will be lessened.

In one embodiment, by changing a hydrocarbon side chain in the base polymer to a hydroxylated alkane, the polymer composition will have hydrophilic properties. For example and in one embodiment, the hydrophilic properties can be useful not only to the improving of properties of wettability, but also can improve the process of coloration of a similar material with different dyes. In this embodiment, hydrophilic properties can be also combined with the property of the increase in mobility of chains of polymers with the growth of the number of atoms of carbon in the hydrocarbon radical. In another embodiment, halogenated hydrocarbon radicals give to the polymer composition high barrier and resistive properties (e.g., heat stability and resistance to aggressive substances). With the growth of a level of halogenation, the high barrier and resistive properties will further increase. For example and in one embodiment, having a side chain that includes two or more halogens further increases the high barrier and resistive properties of the polymer composition.

The base polymer of Formula (I) can be prepared by many different polymerization methods, such as solution, emulsion, suspension or bulk polymerization. Such process are described in, for example G. Moad, D. H. "Solomon The Chemistry of Radical Polymerization", 2006, pp. 181-246, Elsevier ltd., US Pat. No. 1976/3,943,190, US Pat. No. 2008/0,139,836 A1.

In one embodiment, the polymer composition is produced by suspension polymerization. In the suspension polymerization, the molecular weight of the base polymer is controlled so that an appropriate flowability of the resulting polymer can be obtained. For this purpose, a chain transfer agent mercaptan is used, such as n-dodecylmercaptan and n-butylmercaptan. Suspending agents that are usually used in the art can be employed in the suspension polymerization. For example and in one embodiment, the suspension agent can be polyvinyl alcohol, potassium polymethylmethacrylate, sodium dodecyl sulfate, aluminum hydroxide and barium sulfate. In one embodiment, the suspension-polymerization of the base polymer of Formula (I) is conducted using an aqueous suspension medium, at 60° to 95° C. In this embodiment, the polymerization is conducted under a careful dispersement of the monomer(s). To improve the properties of the base polymer/copolymer, the polymerization may be carried out in an inert gas, such as nitrogen or argon.

In one embodiment, for the preparation of the impact resistant composition of the base polymer a bulk polymerization may be used. In one embodiment, the bulk polymerization can be performed in a temperature range from about 35° to about 85° C., from about 0.5 till about 10 hours depending primarily upon the reactants used.

As described above, the bulk polymerization can be used to produce the base polymer. In one embodiment, the bulk polymerization is carried out by preparing a mixture of the selected monomers and the predetermined amount of the polymerization initiator. The mixture was molded in a shape and left to polymerize.

Various well-known free radical initiators, or free radical generating catalysts, can be used during the preparation of the base polymer and/or copolymer. For example and in one embodiment, the free radical initiators that can be used are: persulfates (e.g., ammonium, sodium, and potassium persulfate), peroxides (e.g., benzoyl peroxide, lauroyl peroxide, t-butyl peroxypivalate, chlorobenzoyl peroxide), percarbonates (e.g., di(2-ethylhexyl) peroxydicarbonate, di(sec butyl) peroxydicarbonateand diisopropylperoxydicarbonate, t-butyl perbenzoate), and hydroperoxides (e.g., t-butyl hydroperoxide, paramenthanehydroperoxide, diisopropylbenzene hydroperoxide and cumenehydroperoxide; azocompounds such as 2,2-azobisisobutyronitrile, 4,4'-azobis(4-cyanopentanoic acid)), and other types of free radical initiators. Other features of the invention will become apparent during the description of the exemplary embodiments of this invention, which are given only for illustration of the invention and are not intended to limit the use of the present invention to these examples only.

EXAMPLES

Example 1

Polymerization of Acrylic Copolymer (e.g., the base polymer): In a 4-neck reaction vessel (a reactor) fitted with a condenser, thermocouple, and mechanical stirrer was charged with water (132 g) and sodium dodecyl sulfate (8.8 g of 10% aqueous solution). The mixture was degassed at 80° C., under nitrogen for 40 minutes. A solution of dibenzoyl peroxides (0.5 g) in methyl methacrylate (12 g), ethyl methacrylate (8 g) and hydroxybutyl methacrylate (5 g) was added at a rate 0.4 ml/min by drop funnel. The reaction was held at 80° C. for a further 60 minutes. After completion of the polymerization, the mixture was cooled, filtered through a loose cloth or filter paper, and the resulting polymer was washed with water. The resulting polymer was dried at 60° C. to a constant weight. The structure, composition and purity of the obtained product were confirmed using $H^1$-NMR. The molecular weight and molecular weight distribution (MWD) of the acrylic copolymer is controlled using a capillary rheometer or gel permeation chromatography (GPC). Optical properties are evaluated with UV spectrophotometer. In Example 1, the base polymer side chains are as follows: each of $R^1$, $R^4$, $R^7$ is a hydrogen; $R^2$, $R^5$, $R^8$ are $CH_3$ groups; $R^3$ is $CH_3$ group; $R^6$ is a $C_2H_5$ group; and $R^9$ is a $C_4H_9O$.

Example 2

Preparation of a polymeric composition based on the base polymer of Example 1 and a polycarbonate. 2 g of Poly(bisphenol A carbonate) (melt index 10-14 g/10 min (300° C./1.2 kg) CAS Number 25037-45-0 (Aldrich)) is added to 20 g of the acrylic copolymer of Example 1. The resulting mixture was placed in an extruder with a slot die, the resulting tape having a thickness of 1 mm and a width of 20 mm, cut to 6 cm strips and optical and physico-mechanical characteristics were measured.

Example 3

Preparation of a polymeric composition based on the base polymer of Example 1 and a hydrosiloxane polymer. 2 g of Poly(methyl hydrosiloxane) (CAS 63148-57-2, Mn~1700-3200 (Aldrich)) is added to 20 g of the acrylic copolymer of Example 1. The resulting mixture was placed in an extruder with a slot die, the resulting tape having a thickness of 1 mm and a width of 20 mm, cut to 6 cm strips and optical and physico-mechanical characteristics were measured.

Example 4

Preparation of a polymeric composition based on an acrylic copolymer of Example 1 and an acrylonitrile polymer. 2 g of Poly(acrylonitrile) Mw-150,000 (Aldrich) CAS Number 25014-41-9 (Aldrich)) is added to 20 g of the acrylic copolymer of Example 1. The resulting mixture was placed in an extruder with a slot die, the resulting tape having a thickness of 1 mm and a width of 20 mm, cut to 6 cm strips and optical and physico-mechanical characteristics were measured.

Table 1 below illustrates the different polymer compositions of Examples 1-4. In one embodiment, Example 1 is 100% of the base polymer. In this example, the base polymer side chains are as follows: each of $R^1$, $R^4$, $R^7$ is a hydrogen; $R^2$, $R^5$, $R^8$ are $CH_3$ groups; $R^3$ is $CH_3$ group; $R^6$ is a $C_2H_5$ group; and $R^9$ is a $C_4H_9O$ Example 2 is the polymer composition is 90%:10% by weight of the base polymer of Example 1 and the Poly(bisphenol A carbonate) as described above. Example 3 is the polymer composition is 90%:10% by weight of the base polymer of Example 1 and the hydrosiloxane polymer as described above. Example 4 is the polymer composition is 90%:10% by weight of the base polymer of Example 1 and the Poly(acrylonitrile) as described above.

TABLE I

Preparation of a polymeric compositions
WEIGHT PERCENTAGE OF COMPONENT

| EXMAPLE NO. | BASE POLYMER | POLY CARBONATE | POLY SILOXANE | POLY ACRYLONITRILE |
|---|---|---|---|---|
| 1 | 100 | — | — | — |
| 2 | 90 | 10 | — | — |
| 3 | 90 | — | 10 | — |
| 4 | 90 | — | — | 10 |

Preparation of polymer composition for films for UV spectrophotometry: In a 50 ml beaker equipped with a stirrer, 10 ml of ethyl acetate was added. On an analytical balance, the polymer was weighed in small portions to prevent coalescence of the particles during the vigorous stirring. The polymer was sprinkled into ethyl acetate. Intermixing time was 30 minutes. After finishing the dosing, the solution was stirred until a homogeneous solution for 3-4 hours at 40° C. Furthermore, modifiers (e.g., calcium and magnesium stearate, dioctyl sebacate, glycerol ester, sorbitan ester, and/or an alkyl sulfonate) were sprinkled into a polymer solution. The mixture was stirred for 30-40 minutes to obtain a homogeneous solution state. Then, 0.5 ml of the resulting solution was slowly spread on the surface of Petri dish, which in its turn was covered and was left for 20 hours for drying in traction under the ventilation. This allows the polymer film to form. From the resulting polymer film a segment for spectrophotometry was cut out. Parameters were measured in the range 200-1100 nm.

The polymer film can be used for testing of its physical and optical properties. In one embodiment, test samples are prepared as plates for testing the elongation of the material (methodology standards ASTD). For example and in one embodiment, polymer composition strips for testing was prepared from the polymer composition from Examples 1-4. These strips were tested using ASTM standard testing methodologies (e.g., ASTM D638-TENSILE STRENGTH and ASTM D790-FLEXURAL STRENGTH and FLEXURAL MODULUS).

In one embodiment, the different polymer compositions of Examples 1-4 exhibit different physico-mechanical and optical properties. As illustrated in Table II below, the polymer composition that is 100% of the base polymer has a smaller tensile strength, percentage of elongation, and flexural strength, over the polymer composition that is a mixture of the base polymer with the polycarbonate, hydrosiloxane polymer, and acrylonitrile polymers of Examples 2-4 above. Thus, adding the polycarbonate, hydrosiloxane polymer, and acrylonitrile polymers increases the tensile strength, percentage of elongation, and flexural strength of the resulting polymer composition.

TABLE II

Physico-mechanical properties

| EXAMPLE NO. | TENSILE STRENGTH (p.s.i.) | PERCENTAGE OF ELONGATION | FLEXURAL STRENGTH (p.s.i.) |
|---|---|---|---|
| 1 | 4890 | 65.5 | 5502 |
| 2 | 6370 | 26.7 | 7980 |
| 3 | 5840 | 48.3 | 6430 |
| 4 | 6230 | 32.5 | 7140 |

Even though the physico-mechanical properties of the polymer compositions of Examples 2-4 are improved in comparison to the polymer composition of the Example 1, the polymer compositions of the Examples 2-4 have similar optical properties as the base polymer of Example 1. For example and in one embodiment, the base polymer of Example 1 has 93% of light transmission for UV-A light between 320-400 nm. Adding the different additional polymers of Examples 2-4 still retains a high UV-A light transmission of 92%, 90%, and 89%, respectively. Optical properties of other examples of polymer compositions are illustrated in FIG. 1.

TABLE III

Optical properties

| EX. NO. | PERCENTAGE OF LIGHT TRANSMISSION (at 280-320 nm) UV-B | PERCENTAGE OF LIGHT TRANSMISSION (at 320-400 nm) UV-A | PERCENTAGE OF LIGHT TRANSMISSION (at 400-700 nm) Visible | PERCENTAGE OF LIGHT TRANSMISSION (at 700-1100 nm) near IR |
|---|---|---|---|---|
| 1 | 85 | 93 | 94 | 94 |
| 2 | 83 | 92 | 92 | 92 |
| 3 | 82 | 90 | 92 | 92 |
| 4 | 81 | 89 | 90 | 90 |

Example 5

Preparation of different polymer compositions. The different polymer compositions were prepared using polymerization process is described in Example I. The different compositions are selected in order to demonstrate the dependence of the properties of copolymeric constitution, especially to explain the increase of the elasticity over the increase of the number of carbon atoms in the side chain of the acrylic copolymer. The resulting compositions was placed in an extruder with a slot die, the resulting tape having a thickness of 1 mm and a width of 20 mm, cut to 6 cm strips and physico-mechanical characteristics were measured. These strips were tested using ASTM standard testing methodologies (e.g., ASTM D638-TENSILE STRENGTH)

TABLE IV

Dependence of the physico-mechanical properties of the copolymeric constitution

| EXAM-PLE NO. | Proportions of components in base polymer | | | TENSILE STRENGTH (p.s.i.) | PERCENTAGE OF ELONGATION |
|---|---|---|---|---|---|
| | $R^3 =$ —$CH_3$ | $R^6 =$ —$C_2H_5$ | $R^9 =$ —$C_4H_9$ | | |
| 5 | 60 | 40 | — | 4083 | 14 |
| 6 | 40 | 60 | — | 3865 | 21 |
| 7 | 20 | 80 | — | 3563 | 32 |
| 8 | 20 | 60 | 20 | 3487 | 43 |
| 9 | 20 | 40 | 60 | 3365 | 78 |
| 10 | 20 | 20 | 60 | 3318 | 216 |

As illustrated in Table IV, as the base polymer is further substituted and/or with longer side chains the elasticity of the base polymer increases (as illustrated by the percentage of elongation) and the tensile strength. For samples 5-7, the base polymer has two monomers with side chains as follows: $R^1$ and $R^4$ are hydrogen with $R^2$ and $R^5$ are $CH_3$ groups. For samples 8-10, the base polymer has three monomers in the co-polymer and has side chains as follows: $R^1$, $R^4$, and $R^7$ are hydrogen and $R^2$, $R^5$, and $R^8$ are a $CH_3$ group. For example, for the base polymer with $R^3$=$CH_3$ (60%) and $R^6$=$C_2H_5$ (40%), the base polymer has a tensile strength of 4083 psi and a percentage of elongation of 14%. Reversing the percentage of the $R^3$ and $R^6$ components to be 40% and 60%, respectively, decreases the tensile strength to 3865 psi and increases the percentage of elongation to 21%. Further substituting the copolymer to include $R^9$=$C_4H_9$, also increase the elasticity of the copolymer. For example, for the base polymer with $R^3$=$CH_3$ (20%), $R^6$=$C_2H_5$ (60%), and $R^9$=$C_4H_9$ (20%), the base polymer has a tensile strength of 3487 psi and a percentage of elongation of 43%. Increasing the percentage of the $R^9$ in the base polymer component further increases the elasticity of the base polymer. In one embodiment, the elasticity of the polymer composition depends more on the R-groups in the carboxyl than R-groups attached to the carbon backbone of the base polymer.

Numerous modifications and variations of the present invention are possible in light of the above teachings. It is therefore to be understood that within the scope of the appended claims, the invention may be practiced otherwise than as specifically described herein.

In one embodiment, the polymer composition includes one or more additional functional additives, such as: fine powders of metals, fluorescent, and other soluble colorants. The purpose of the introduction of these additives is to make a given set of properties of the final composition (e.g., fluorescence, color, magnetic properties, or other macroscopic properties). In this embodiment, the proposed polymer composition may be used as a starting material for the manufacture of a wide variety of polymer products. The possibility of programming further properties of the polymer composition in a wide range is due to the possible modifications and variation of the structure of the polymer composition.

As described above, the polymer composition is a polymer mixture that defines some of the key properties (e.g., high optical transparency), but may lack the strength properties for different applications. For example and in one embodiment, Example 1 shows lower physico-mechanical properties as compared with the other polymer compositions in Example (See Table II above). The additions of the polycarbonate, hydrosiloxane polymer, and acrylonitrile polymers as illustrated in Examples 2-4 improve the strength and other properties. In one embodiment, this allows the resulting polymer compositions to be thermoplastically processed as a material for the manufacture of highly transparent and durable products.

In one embodiment, adding the additional polymers (e.g., the polycarbonate, hydrosiloxane polymer, and acrylonitrile polymers of Examples 2-4) to the base polymer may lead to a synergy of properties in the resulting polymer composition. This improves of characteristics of the resulting polymer composition without loss of key property of basic polymer such as high transparency over a wide wavelength range. For example and in one embodiment, the base polymer with the polysilcon gives the properties of transparency, elasticity, resistance to reagents and environment, and allows the resulting polymer composition to be used in textiles, nonwoven fabrics, thin films. As another example and in another embodiment, the base polymer with the polycarbonate polymer gives the properties of transparency, durability and impact strength and allows the resulting polymer composition to be used in translucent constructions. In yet another example and embodiment, the base polymer with the polyvinyl polymer will give the resulting polymer composition the properties of transparency and, depending on the selected polymer, the increased ability to react at the expense of different functional groups, hydrophilic properties, the high mechanical characteristics, and, in some cases, increased thermal stability.

Variation in the preparation of the base polymer allows a chemist to design future copolymers with the desired set of properties by varying the reacting monomer structures. In one embodiment, using as a functional basis copolymer (e.g., the acrylate/methacrylate copolymers) instead of the polymer blends and alloys, a chemist can more easily develop the future properties of the polymer composition, where the range of properties which can be given to the future composition is wider than in the case with a conventional methacrylate polymer or a mixture of methacrylate polymers. In one embodiment, the functionalization of the base polymer can be done by varying the structure and ratio of components, production method and the conditions of the polymerization and copolymerization, by the radical structural changes, and/or functional substitution.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A high transparency, thermoplastically processible polymer composition, the composition comprising:
   (a) a base polymer, wherein the base polymer is an organic copolymer that includes a main constitutional unit of Formula (I),

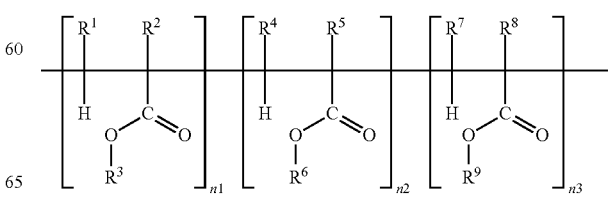

wherein,

R$^1$, R$^4$, and R$^7$ are independently selected form the group consisting of hydrogen and a hydrocarbon group having 1-3 carbon atoms, R$^2$, R$^5$, and R$^8$ are independently selected from the group consisting of hydrogen and a hydrocarbon group having 1-9 carbon atoms, R$^3$, R$^6$, and R$^9$ are independently selected from the group consisting of a hydrocarbon group having 1-9 carbon atoms, a hydroxyalkyl group having 1-9 carbon atoms, an aminoalkyl group having 1-6 carbon atoms, a halocarbon group having 1-6 carbon atoms and at least one halogen, an aryl group, and a cycloalkyl having 4-8 carbon atoms, and n1, n2, n3 are each an integer from 5 to 30,000;

(b) a C$_1$-C$_{20}$ alkyl methacrylate polymer, wherein the relative content of the alkyl methacrylate polymer to the base polymer by weight is from 1:19 to 19:1;

(c) a polyvinyl polymer, from 1% to 20% by weight, of general Formula (IV),

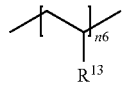

wherein, R$^{13}$ is selected from the group consisting of a cyano group, an acetoxy group, a hydrocarbon group having 1-9 carbon atoms, a hydroxy group, a halogen group and n6 is an integer from 10000 to 300,000; and (d) a plasticizer, from 0.1% to 3% by weight, wherein the plasticizer is an ester of sebacic acid;

wherein the composition has not less than 89% optical transparency at wavelengths between 320 nm and 1100 nm.

2. The composition of claim 1, wherein the polyvinyl polymer is selected from the group consisting of polyacrylonitrile, poly(vinyl acetate), poly(vinyl alcohol), polyvinylchloride and polystyrene.

3. The composition of claim 1 wherein the polymer composition can be processed thermoplastically into highly transparent and durable fibers and sheets.

4. The composition of claim 1, wherein the composition has an elasticity of equal or greater than 21%.

5. The composition of claim 1, wherein the base polymer has optical transparency of from 81% to 93% at wavelengths between 280 nm and 400 nm.

* * * * *